US005492007A

United States Patent [19]

Noble et al.

[11] Patent Number: 5,492,007

[45] Date of Patent: Feb. 20, 1996

[54] MISFIRE DETECTION IN A SPARK IGNITION ENGINE

[75] Inventors: Gardiner A. Noble, Farmington; Carl R. Morganti, Farmington Hills, both of Mich.

[73] Assignee: Chrysler Corporation, Highland Park, Mich.

[21] Appl. No.: 380,274

[22] Filed: Jan. 30, 1995

[51] Int. Cl.[6] .................. G01M 15/00

[52] U.S. Cl. .................. 73/117.3; 324/393

[58] Field of Search .................. 73/35 I, 116, 117.3; 324/393; 123/419, 436; 364/431.08

[56] References Cited

U.S. PATENT DOCUMENTS

| | | | |
|---|---|---|---|
| 4,846,129 | 7/1989 | Noble | 123/425 |
| 4,886,029 | 12/1989 | Lill et al. | 73/117.3 |
| 4,987,771 | 1/1991 | Iwata | 73/117.3 |
| 5,191,788 | 3/1993 | Nishimura | 73/117.3 |
| 5,194,813 | 3/1993 | Hannah et al. | 73/117.3 |
| 5,237,280 | 8/1993 | Arnold et al. | 324/393 |
| 5,272,914 | 12/1993 | Murata et al. | 73/116 |
| 5,343,844 | 9/1994 | Fukui et al. | 73/116 |
| 5,347,855 | 9/1994 | Miyata et al. | 73/116 |
| 5,347,856 | 9/1994 | Miyata et al. | 73/116 |
| 5,349,299 | 9/1994 | Kanehiro et al. | 324/393 |
| 5,365,910 | 11/1994 | Miyata et al. | 73/116 |
| 5,383,350 | 1/1995 | Bennett et al. | 73/117.3 |
| 5,387,870 | 2/1995 | Knapp et al. | 73/117.3 |

*Primary Examiner*—Richard Chilcot
*Assistant Examiner*—Eric S. McCall
*Attorney, Agent, or Firm*—Mark P. Calcaterra

[57] ABSTRACT

A method for detecting misfire in a cylinder of an internal combustion engine through the ignition system of the engine. The present invention first predicts a time-to-fire measurement for an interrogating spark, then measures the actual time-to-fire measurement of the interrogating spark and then compares the predicted measurement and the actual measurement to determine whether misfire has occurred.

14 Claims, 5 Drawing Sheets

MISFIRE DETECTION IN A SPARK IGNITION ENGINE

BACKGROUND AND SUMMARY OF THE INVENTION

1. Field of the Invention

The present invention relates generally to the detection of misfire in a spark ignition engine, and more particularly to the use of the ignition system in a spark ignition engine to detect the misfiring of the engine.

2. Description of the Related Art

U.S. Pat. No. 4,846, 129, which is commonly assigned to the assignee of the present application, and which is hereby incorporated by reference, discloses an ignition system of an internal combustion engine as might be used in a motor vehicle. The ignition system includes an on-board ignition controller or microprocessor which receives input signals from engine timing transducers, an engine timing controller, and a vehicle oxygen sensor module. A power supply, receiving electrical power from the vehicle battery, provides power to the system for operation. Based on the input signals, the microprocessor produces output signals which energize spark plugs through drivers and pulse transformers, both of which are mounted on the spark plugs.

SUMMARY OF THE INVENTION

It is well known that the occurrence of misfire, the absence of combustion, within one or more cylinders of an internal combustion engine is a precursor to a number of engine and engine related problems. Two problems specifically associated with misfire include decreased fuel economy and the emission of unburnt hydrocarbons into the atmosphere. Various reasons are known to exist for the occurrence of misfire. The present invention, however, is not so much related to the reasons for the occurrence of misfire as it is to the detection of misfire itself.

The physical principle utilized by the present invention in detecting misfire is that the breakdown voltage occurring during the creation of a spark in the combustion chamber will differ under firing conditions from that occurring under misfiring conditions. However, the breakdown voltage itself is affected by an myriad of other parameters including fuel/air ratio, manifold pressure, rpm, spark gap size (including gap erosion), spark plug fouling, and fuel/air mixture temperature.

The present invention accomplishes misfire detection by first sensing the breakdown voltage during an ignition spark and subsequently sensing the breakdown voltage during a second spark (hereinafter referred to as the "interrogating spark"). The interrogating spark is a diagnostic spark which is fired into the spark gap after the ignition spark, but within a crankangle window where combustion should be in process (such as at top-dead-center, TDC). The ratio of these two breakdown voltages significantly varies between firing conditions and misfiring conditions. Also, this ratio is not sensitive to the aforementioned variables. As such, a central feature of the present invention is that it largely rejects the above variables and isolates the effects of misfire on the breakdown voltage.

Once misfire has been detected, the information can be used by an on-board controller to notify the motorist that the malfunction is occurring or that servicing of the engine is required. Additionally, the information can be used by the on-board controller to stop the introduction of fuel into the misfiring cylinder thereby saving fuel and preventing the release of unburnt hydrocarbons into the atmosphere.

In summary, the method of the present invention for detecting misfire in the combustion cylinder of a spark ignition engine, using an ignition spark and an interrogating spark, comprises the following steps: determining a predicted time-to-fire measurement of the interrogating spark; measuring an actual time-to-fire measurement of the interrogating spark; and comparing the actual time-to-fire measurement against the predicted time-to-fire measurement to determine whether misfire has occurred.

Additional benefits and advantages of the present invention will become apparent to those skilled in the art to which this invention relates from the subsequent description of the preferred embodiments and the appended claims, taken in conjunction with the accompanying drawings.

DESCRIPTION OF THE PREFERRED EMBODIMENT

The present method of misfire detection disclosed herein is specifically explained in conjunction with the ignition system components described in U.S. Pat. No. 4,846,129, issued to Noble. Hereinafter, this patent will simply be referred to as the Noble patent. Reference to the Noble patent is not intended to imply that use of the present invention is strictly limited to implementation with the particular ignition components described therein. As one skilled in the art will appreciate, it is Applicants' belief that the present invention has broad applicability to a variety of ignition systems.

The discussion which follows goes through the various steps and transfer functions which ultimately relate measurements of time-to-fire and breakdown voltage to the occurrence of misfire within a cylinder of an internal combustion engine. The determination of misfire according to this invention can be performed on an individual cylinder basis and over a wide range of rpm and load.

Figure 1:
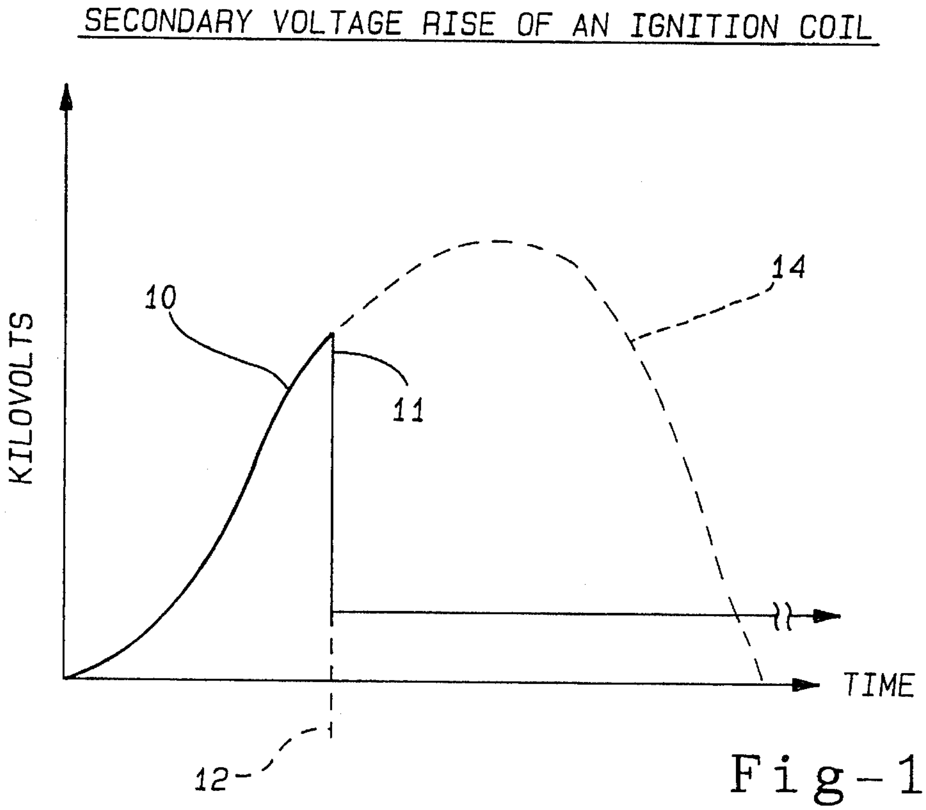
FIG. 1 is a graphical illustration of the secondary voltage rise and discharge of an ignition coil plotted against time.

Referring now to the drawings, FIG. 1 shows that an ignition coil has a predictable and repeatable secondary voltage rise characteristic (shown for both breakdown and non-breakdown situations). As illustrated by curve 10, the voltage at the secondary of the coil 58 increases with respect to time until the instant of breakdown discharge 12, whereupon it drops substantially, inducing a high current in the circuit and causing the formation of a spark across the gap of a spark plug 62. Curve 14, shown in dashed lines, represents the secondary voltage which would be observed absent any discharging event.

Figure 2:
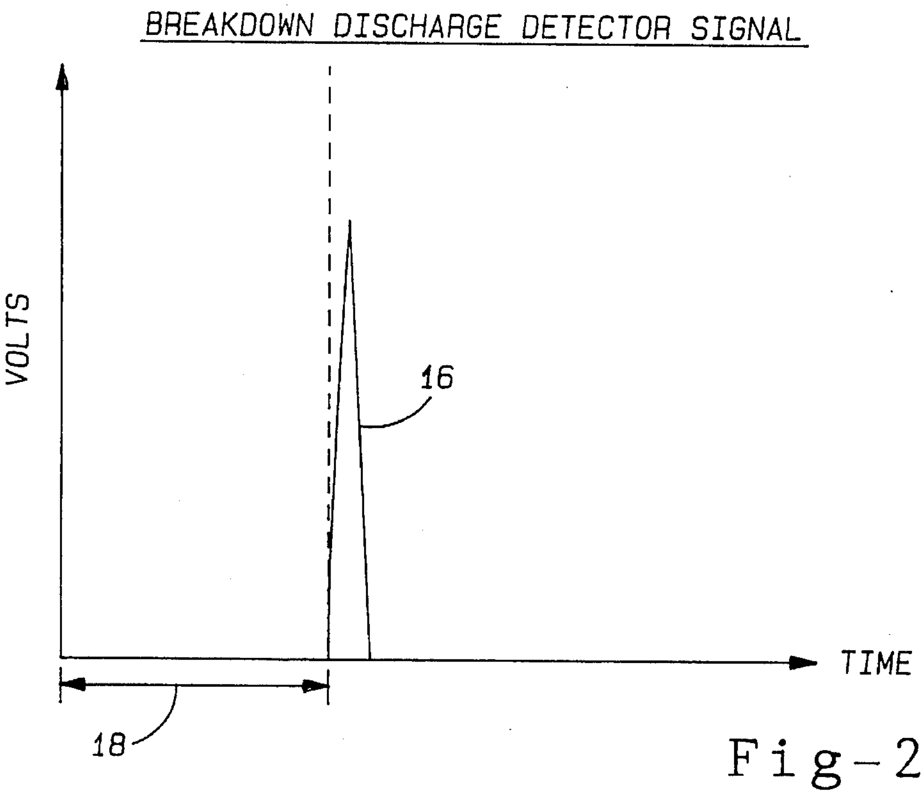
FIG. 2 is a graphical representation of a signal generated by a breakdown detector at the instant of the "breakdown" phase of a spark discharge.

Curve 16 in FIG. 2 depicts an output signal created by a breakdown detector 60 (disclosed in the Noble patent) at the instant of the breakdown discharge 12 and the beginning spark discharge. The time interval, designated at 18, from the beginning of the secondary voltage rise to the instant when the breakdown detector 60 outputs its signal 16 is noted in FIG. 2 and will be referred to in this discussion as the "time-to-fire".

Figure 3:
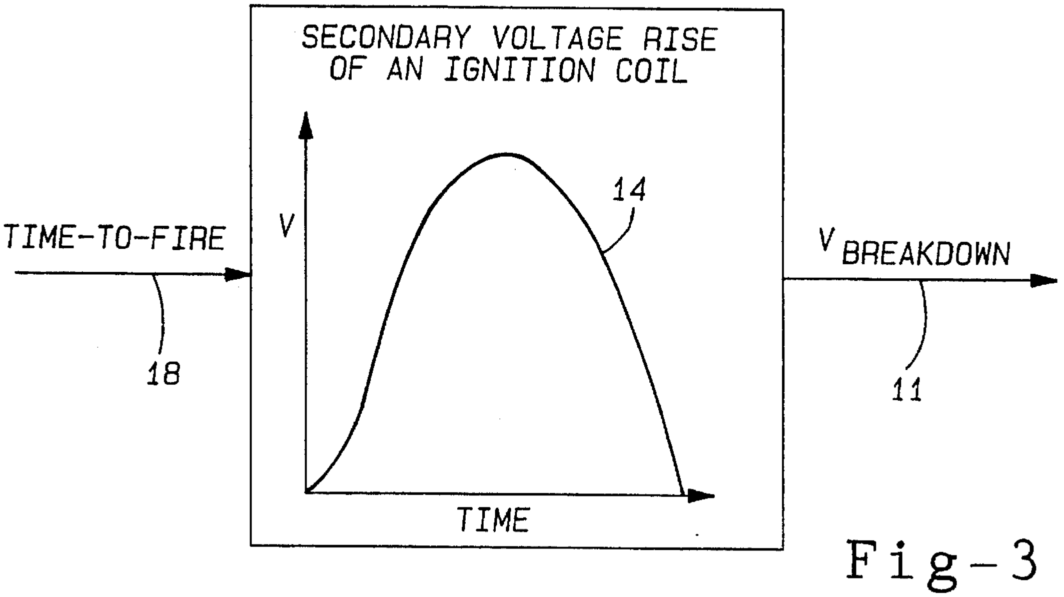
FIG. 3 depicts, in block flow diagram form, the calculation of breakdown voltage by measuring time-to-fire and using the graph of FIG. 1 relating secondary voltage rise to time.

Knowing the secondary voltage rise 10 as a function time (FIG. 1 ), breakdown voltage 11 can be determined by measuring the time-to-fire 18 as discussed above. FIG. 3 represents the calculation of the breakdown voltage 11 by measuring the time-to-fire 18 and using the known secondary voltage rise curve 10. This is shown occurring in FIG. 3 in block flow diagram form.

Having established a methodology for calculating the breakdown voltage 11 in an operating combustion engine, a transfer function can be determined which will relate the breakdown voltage 11 to the processes occurring in the combustion chamber during misfire. The fundamental equation used for this purpose is Paschen's Equation. Paschen's Equation predicts the breakdown voltage 11 as a function of pressure, temperature and spark plug gap size. The appropriate form of Paschen's Equation for this determination is as follows:

$$V_b = A \cdot P \cdot d/T + B \cdot \sqrt{P \cdot d/T} \qquad \text{Eq. 1}$$

where:

$V_b$=breakdown voltage;

A=constant;

B=constant;

P=pressure;

T=temperature; and d=gap size.

The constants A and B were substituted for the actual numerical constants used in Paschen's Equation because Paschen's Equation was originally derived for a spark discharge into dry air and not into a fuel/air mixture (which might also contain moisture). Applicant's own empirical work in an engine test cell has verified that, with the appropriate values for constants A and B, Paschen's Equation can be used for predicting breakdown voltage 11 in the combustion chamber of a spark ignition engine.

Having established the applicability of Paschen's Equation for spark discharges in a combustion Chamber, the following discussion shows how breakdown voltage in a combustion chamber behaves in a predictable way for a misfire condition. As mentioned above, the breakdown voltage for a misfiring condition behaves differently from that of a firing condition.

The first equation which needs to be considered is the kinematic equation giving the volume of the engine's combustion chamber as a function of crankangle position. This equation is as follows:

$$V(\Theta) = R\left[(1-\cos\Theta) + \frac{L}{R}\left(1-\sqrt{\sin^2\Theta}\right)\right]\pi\left(\frac{B}{2}\right)^2 + V_c \qquad \text{Eq. 2}$$

where

V(Θ)=volume of cylinder as a function of crankangle;

R=radius of crank (2R=stroke);

L=length of connecting rod;

Θ=crankangle (measured from TDC);

B=bore of cylinder; and $V_c$=clearance volume.

Figure 4:
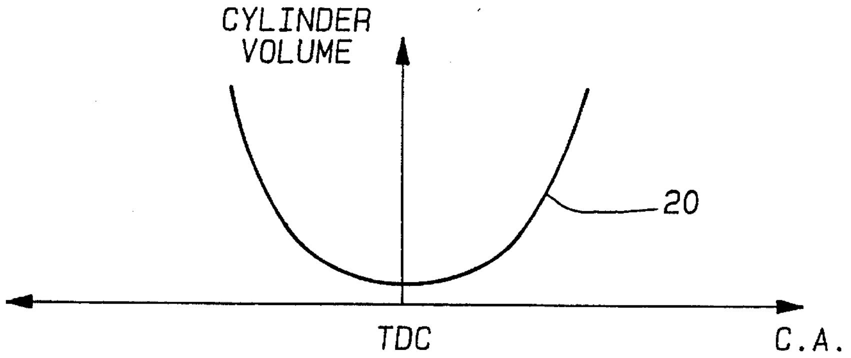
FIG. 4 is a graph relating the combustion cylinder volume to the crankangle position of an internal combustion engine during misfire.

The curve 20 of FIG. 4 shows the combustion chamber volume versus crankangle position.

In a misfiring combustion cylinder, the in-cylinder pressure can be approximated by a polytropic compression process (up to TDC) followed by a polytropic expansion (after TDC) during the power stroke. By substituting the volume values from the kinematic equation (Eq. 2) into the thermodynamic equation for a polytropic compression, the values for pressure as a function of crankangle position, P(Θ), can be determined. The resulting equation for pressure as a function of crankangle position is:

$$P(\Theta) = P_o\left(\frac{V_o}{V(\Theta)}\right)^n \qquad \text{Eq. 3}$$

where:

n=gas constant (1.36 is typical, although an empirically determined value should be generated to best represent gas characteristics for misfire detection);

$P_o$=pressure at the instant of intake valve closure; and $V_o$=volume at the instant of intake valve closure.

Figure 5:
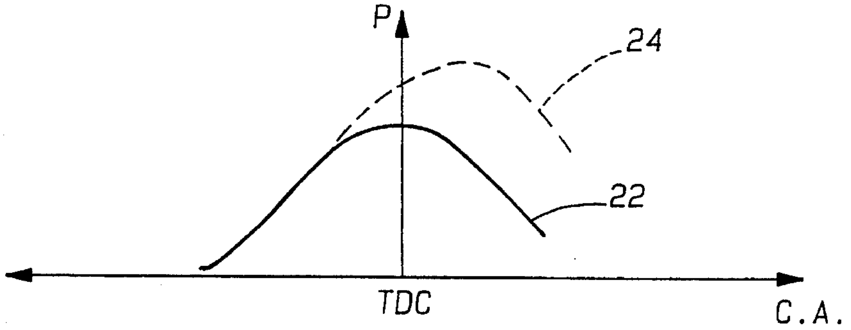
FIG. 5 is a graphical representation of the combustion cylinder pressure versus the crankangle position in an internal combustion engine.

For a misfiring condition, the above pressure equation (Eq. 3) produces a pressure versus crankangle position plot 22 substantially as shown in FIG. 5. A pressure versus crankangle position curve 24 for a firing condition is also shown in FIG. 5.

Figure 6:
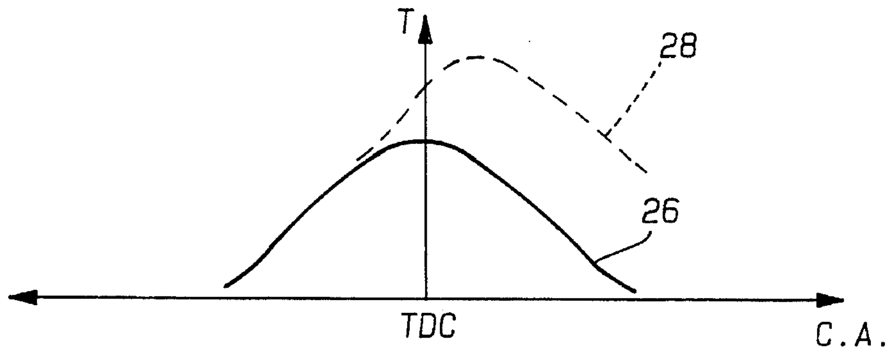
FIG. 6 is a graph relating the combustion cylinder temperature to the crankangle position.

The above values of pressure versus crankangle position can similarly be substituted into the polytropic equation for temperature to produce a temperature versus crankangle position curve 26 for a misfiring condition. Equation 4, set out below, is the temperature equation for a polytropic compression or expansion process:

$$T(\Theta) = T_o\left(\frac{P(\Theta)}{P_o}\right)^{n-1} \qquad \text{Eq. 4}$$

where:

n=gas constant; and $T_o$=mixture temperature at the instant of intake valve closure. FIG. 6 depicts the resulting curve 26 of in-cylinder temperature versus crankangle position using the above equation (Eq. 4). Also shown in FIG. 6 is a curve 28 illustrating the in-cylinder temperature verses crankangle position plot for a firing condition.

Having established values for pressure and temperature versus crankangle position, these values can now be substituted back into Paschen's equation (Eq. 1) to predict the breakdown voltage 11 as a function of crankangle position. The resulting plot of this substitution is depicted in FIG. 7 as curve 30 for a misfiring condition and as curve 32 for a firing condition.

Figure 7:
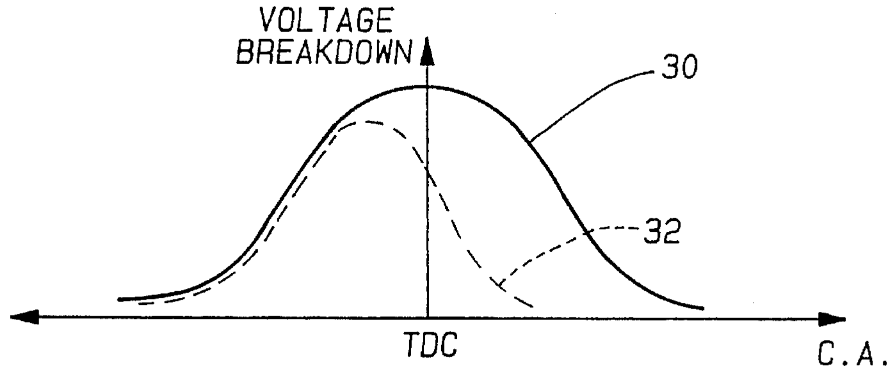
FIG. 7 is a graphical representation of the breakdown voltage verses the crankangle position as calculated from FIGS. 5 and 6 and Paschen's Law.

Finally, the breakdown voltage versus crankangle curves of FIG. 7 can be converted into a time-to-fire versus crankangle position plot by using the secondary voltage rise characteristic shown in FIG. 3. The time-to-fire versus crankangle curves 34 and 36 for both a misfiring and a firing condition are respectively shown in FIG. 8. The end effect of the above analysis is a time-to-fire curve 34 which mirrors pressure and temperature as a function of crankangle position for a misfiring condition.

Figure 11:
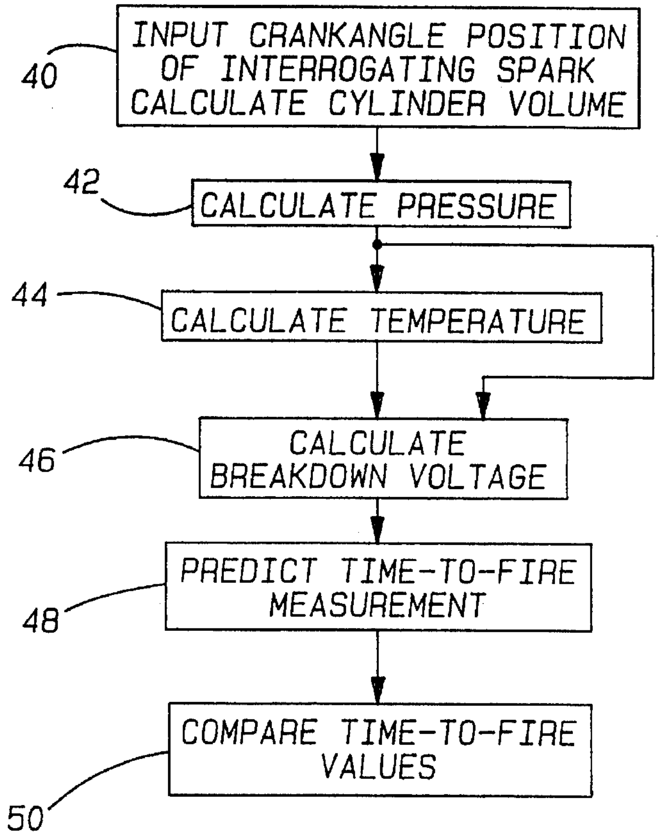
FIG. 11 is a block diagram flow chart showing the methodology for determining misfire according to the present invention.
Figure 12:
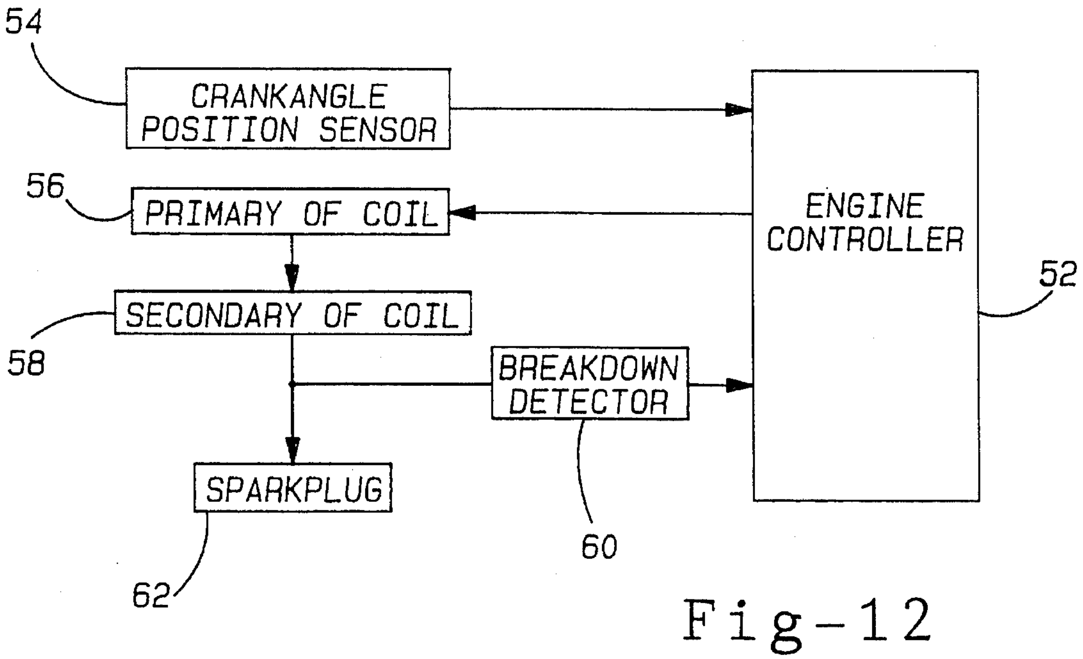
FIG. 12 is a schematic diagram of the various sensor and control elements utilized with the present invention.

FIG. 11 summarizes, in block flow diagram form, the underlying steps used to detect the occurrence of misfire. In block 40, the crankangle position is used to determine the cylinder volume over the course of a cycle for misfire conditions. The cylinder volume is then used in block 42 to calculate the pressure at the given crankangle position. Knowing the pressure, temperature is calculated in block 44. Both the pressure and the temperature are then used in block 46 to calculate the breakdown voltage. Once the breakdown voltage has been calculated, its value is used to determine a time-to-fire measurement for the interrogating spark based on the known secondary voltage rise curve of FIG. 3. The calculated or predicted time-to-fire measurement of the interrogating spark is then compared, in block 50, by the controller 52 against the actual time-to-fire measurement of the interrogating spark. If the actual and calculated time-to-fire measurements are substantially close in value, misfire has occurred and the engine controller 52 will respond accordingly.

Although the absolute value of the time-to-fire measurement will increase or decrease in response to factors such as engine manifold pressure, rpm, humidity, and fuel/air ratio, the shape of the time-to-fire curve 34 will be retained despite these variables. Therefore, if the time-to-fire 18 is measured for an ignition spark and a subsequent interrogating spark at approximately TDC, the ratio of these two time-to-fire values can be predicted for a misfiring condition through use of the curve 34 in FIG. 8. Since all of the variables mentioned above have a proportional effect on the time-to-fire for both the ignition spark and the interrogating spark, taking the ratio of these two time-to-fire values rejects the effect of the aforementioned variables.

Applicant's empirical work with an engine test cell has shown that this ratio, under misfiring conditions, is substantially different from the ratio produced under normal combustion conditions. It is the difference in the ratio between firing and misfiring conditions which forms the basis for detecting the misfiring condition. The conditions in the combustion cylinder during firing are different from those seen during misfire and the actual time-to-fire of the interrogating spark will, therefore, vary accordingly. Under normal combustion conditions, the ratio is consistently less than that produced under misfiring conditions. A qualitative representation of normal combustion data is shown in FIGS. 5 through 8.

Figure 8:
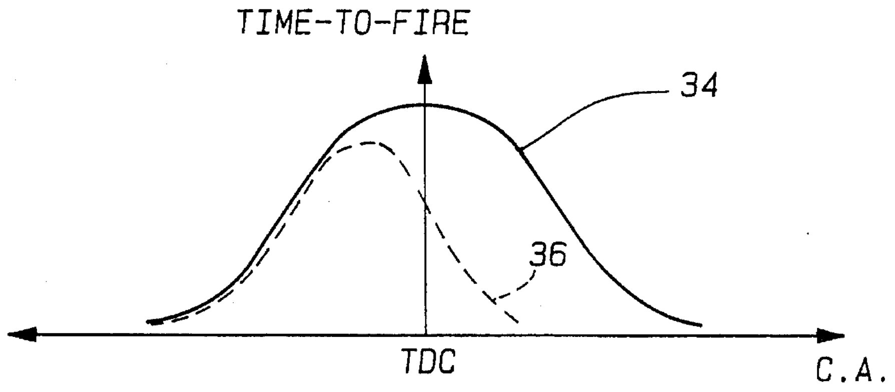
FIG. 8 is a graph relating the time-to-fire to the crankangle position.
Figure 9:
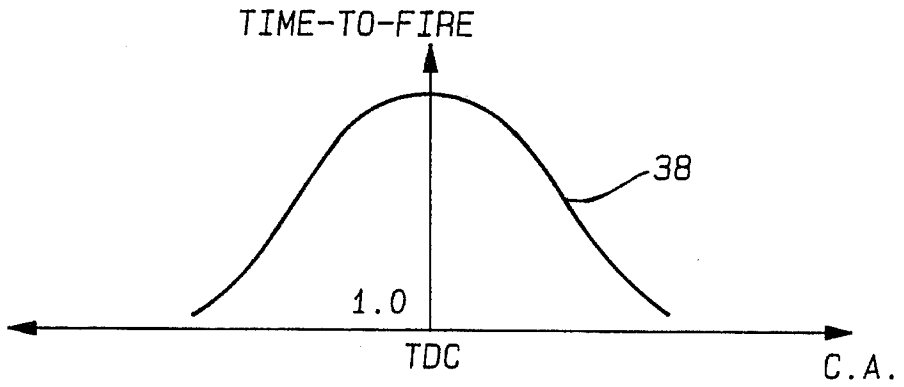
FIG. 9 is a graph illustrating FIG. 8 normalized to unity.

Since the ratio is the single attribute required for detecting misfire, it is convenient to normalize the curve 34 of FIG. 8 to unity at some crankangle position. The normalized curve 38 is shown in FIG. 9. The use of this curve 38 in a misfire detection system of a vehicle is further explained below.

In an operating spark ignition engine embodying the principles of the present invention, a counter in the engine controller 52 is used to measure the time-to-fire of the ignition spark. The counter is started at the moment the secondary voltage begins to rise and is stopped by the output signal of the breakdown detector 60 at the instant of the breakdown discharge. This ignition spark time-to-fire measurement is stored by the engine controller 52.

Another time-to-fire measurement is taken for the subsequent interrogating spark, which is fired near TDC since this position was found to give a good signal-to-noise ratio for the detection of misfire. Similar to the above, a counter in the engine controller 52 is started at the beginning of the secondary voltage rise for the interrogating spark and stopped at the instant of the breakdown discharge.

The normalized curve of FIG. 9 is programmed into the memory of the engine controller 52 and is used in conjunction with the ignition spark time-to-fire measurement to predict an interrogating spark time-to-fire measurement for a misfire event.

Figure 10:
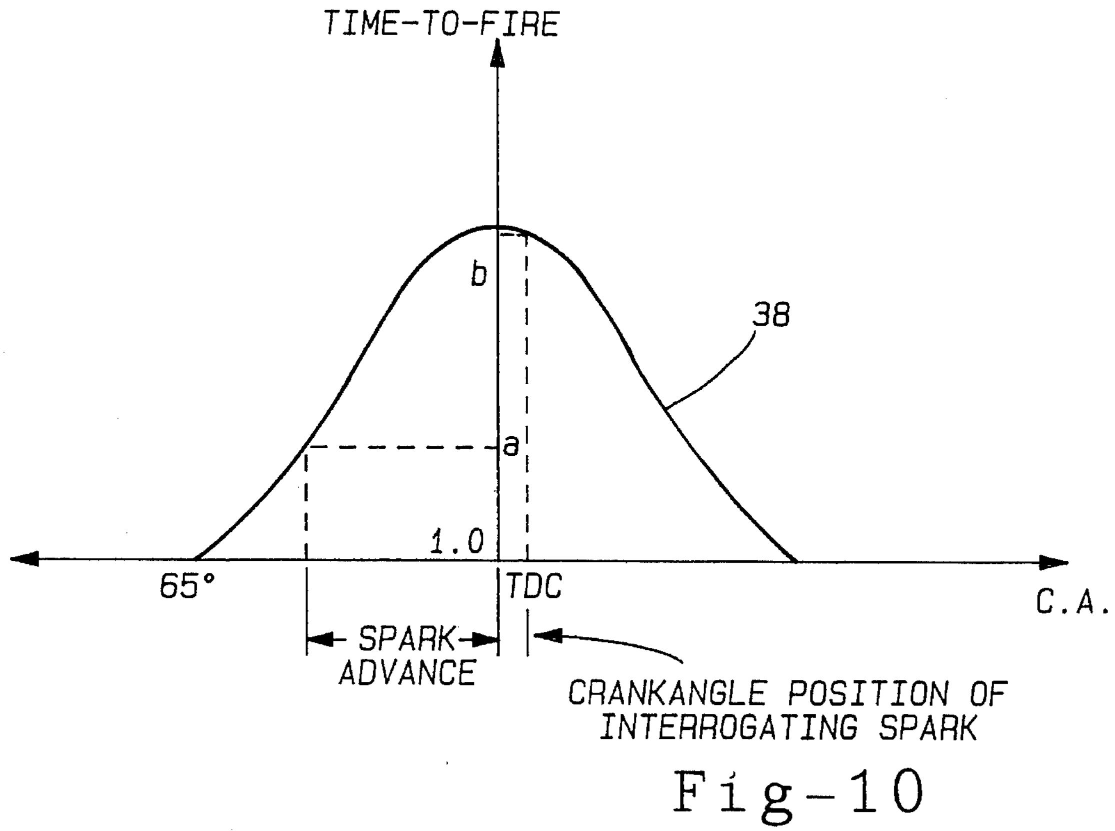
FIG. 10 is a graph illustrating various factors used in calculating time-to-fire of the interrogating spark for determining misfire.

The calculated measurement for the interrogating spark time-to-fire is then compared to the actual measurement of the interrogating spark time-to-fire. If the calculated measurement for misfire and the actual measurement are sufficiently close in value, the engine controller 52 will presume that a misfire condition exists and an appropriate response or action will be taken. As such, outputs of the engine controller 52 may notify the motorist that the engine requires servicing and/or it may stop the introduction of fuel into the misfiring cylinder to prevent the wasting of fuel and the release of unburnt hydrocarbons into the atmosphere. FIG. 10 illustrated the required measurements necessary for such a computation, including the time-to-fire of the ignition spark (a) and the time-to-fire of the interrogating spark (b).

The present invention has been described in an illustrative manner. It is to be understood that the terminology which has been used is intended to be in the nature of words of description rather than words of limitation. Thus, many modifications and variations of the present invention are believed to be possible in light of the above teachings and therefore within the scope of the appended claims.

What is claimed is:

1. A method for detecting misfire in a combustion cylinder of a spark ignition engine using an onboard engine controller, an ignition spark, an interrogating spark and an ignition coil having primary and secondary windings, said interrogating spark occurring after said ignition spark but during the same combustion cycle, said method comprising the steps of:

determining a predicted time-to-fire measurement of said interrogating spark, said predicted time-to-fire measurement being measured from a predetermined crankangle position dependent upon engine operating parameters for initiating a secondary voltage rise in said secondary of said ignition coil such that breakdown discharge of said of said interrogating spark will occur near top-dead-center of the combustion cycle;

measuring an actual time-to-fire measurement of said interrogating spark from initiation of a secondary voltage rise in said secondary of said ignition coil and ending at the instance of actual occurrence of breakdown discharge of said interrogating spark;

comparing said actual time-to-fire measurement against said predicted time-to-fire measurement to determine whether misfire has occurred; and concluding a non-occurrence of misfire when said actual time-to-fire measurement substantially approximates said predicted time-to-fire measurement.

2. The method according to claim 1 wherein said measuring a step of said actual time-to-fire measurement includes the step of inputting to said controller crankangle position at the instance of occurrence of said interrogating spark.

3. The method according to claim 2 wherein said measuring step of said actual time-to-fire measurement includes the step of calculating volume of said cylinder based on said crankangle position inputted to said controller.

4. The method according to claim 3 wherein said determining step further includes the step of calculating pressure within said cylinder based upon said volume calculated from said crankangle position.

5. The method according to claim 4 wherein said determining step further includes the step of calculating temperature within said cylinder based upon said pressure calculated from said volume and said crankangle position.

6. The method according to claim 5 wherein said determining step further includes the step of calculating breakdown voltage using Paschen's equation and said temperature and said pressure.

7. The method according to claim 1 wherein said determining step further includes the step of relating said breakdown voltage to said actual time-to-fire measurement and comparing said actual time-to-fire measurement to said predicted time-to-fire measurement to conclude an occurrence or non-occurrence of misfire.

8. A method of detecting misfire in a combustion cylinder of a spark ignition engine through an ignition system of said engine, said ignition system including a controller and a crankangle position detector, said detector signaling crankangle positions to said controller, said controller initiating both an ignition spark and an interrogating spark during a combustion cycle and in response to signaling by said detector, said method comprising the steps of:

programming said controller with data correlating crankangle position to time-to-fire of said interrogating spark under misfire conditions;

measuring actual time-to-fire of said ignition spark from initiation of a secondary voltage rise to an occurrence of breakdown voltage;

storing said actual time-to-fire measurement of said ignition spark in said controller;

measuring an actual time-to-fire of an interrogating spark from initiation of a secondary voltage rise to an occurrence of breakdown voltage;

storing said actual time-to-fire of said interrogating spark in said controller;

detecting crankangle position during occurrence of said interrogating spark;

storing said crankangle position of said interrogating spark within said controller;

correlating said crankangle position with time-to-fire of said interrogating spark under misfire conditions to determine a predicted time-to-fire of said interrogating spark under misfire conditions;

comparing said predicted time-to-fire of said interrogating spark under misfire conditions against said actual time-to-fire of said interrogating spark to detect the occurrences of misfire in said cylinder; and determining an occurrence of misfire when said predicted time-to-fire of said interrogating spark under misfire conditions substantially approximates said actual time-to-fire of said interrogating spark.

9. The method according to claim 1 wherein said comparing step further involves the step of calculating a calculated breakdown voltage ratio, said breakdown voltage ratio being a ratio of a measured breakdown voltage during said interrogating spark as determined by said actual time-to-fire measurement to a measured breakdown voltage of said ignition spark, said calculated breakdown voltage ratio being compared to known breakdown voltage ratios to determine an occurrence of misfire.

10. The method according to claim 9 wherein said known breakdown voltages are for a misfire condition.

11. The method according to claim 9 wherein said known breakdown voltages are for a non-misfire condition.

12. The method according to claim 8 wherein said comparing step further involves the step of calculating a calculated breakdown voltage ratio, said breakdown voltage ratio being a ratio of a measured breakdown voltage during said interrogating spark to a measured breakdown voltage of said ignition spark, said calculated breakdown voltage ratio being compared to known breakdown voltages to determine an occurrence of misfire.

13. The method according to claim 12 wherein said known breakdown voltages are for a misfire condition.

14. The method according to claim 12 wherein said known breakdown voltages are for a non-misfire condition.

* * * * *